US012111889B1

(12) United States Patent
Kumar et al.

(10) Patent No.: US 12,111,889 B1
(45) Date of Patent: *Oct. 8, 2024

(54) AUTOMATED AND PERIODIC UPDATING OF ITEM IMAGES DATA STORE

(71) Applicant: Amazon Technologies, Inc., Seattle, WA (US)

(72) Inventors: Dilip Kumar, Seattle, WA (US); Jon Robert Ducrou, Seattle, WA (US); Joseph Xavier, Seattle, WA (US); Ramanathan Palaniappan, Issaquah, WA (US); Michel Leonard Goldstein, Seattle, WA (US); Michael Lee Brundage, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/350,402

(22) Filed: Jun. 17, 2021

Related U.S. Application Data

(63) Continuation of application No. 16/415,390, filed on May 17, 2019, now Pat. No. 11,042,787, which is a
(Continued)

(51) Int. Cl.
  *G06F 18/24* (2023.01)
  *G06V 10/75* (2022.01)

(52) U.S. Cl.
  CPC ............ *G06F 18/24* (2023.01); *G06V 10/751* (2022.01)

(58) Field of Classification Search
  CPC .................. G06K 9/6267; G06T 7/001; G06T 2207/30108; G06T 7/0012; G06T 7/30;
  (Continued)

(56) References Cited

U.S. PATENT DOCUMENTS 5,930,771 A  7/1999  Stapp
6,601,764 B1  8/2003  Goodwin, I
(Continued)

FOREIGN PATENT DOCUMENTS

KR   20070103482 A   10/2007
KR   20080036518 A   4/2008
KR     101435457 B1   8/2014

OTHER PUBLICATIONS

Abhaya Asthana et al., "An Indoor Wireless System for Personalized Shopping Assistance", Proceedings of IEEE Workshop on Mobile Computing Systems and Applications, 1994, pp. 69-74, Publisher: IEEE Computer Society Press.
(Continued)

*Primary Examiner* — Ian L Lemieux
(74) *Attorney, Agent, or Firm* — Athorus, PLLC

(57) ABSTRACT

This disclosure describes a system for automatically updating item image information stored in an item images data store and used for processing captured images to identify items represented in those images. In one implementation, once an identity of an item has been verified, captured images of that item are associated with the item and stored in the item images data store. As a result, the item images data store is updated each time an image of the item is captured and the identity of the item is verified.

16 Claims, 7 Drawing Sheets

Related U.S. Application Data continuation of application No. 13/929,763, filed on Jun. 27, 2013, now Pat. No. 10,296,814.

(58) Field of Classification Search
CPC ....... G06T 1/0007; G06T 1/20; G06T 19/006; G06T 2207/10012; G06T 2207/10016; G06T 2207/10024; G06T 2207/10061; G06T 2207/20021; G06T 2207/20056; G06T 2207/30148; G06T 2207/30232; G06T 7/0008; G06T 7/246; G06T 7/285; G06T 7/33; G06T 7/37; G06T 7/73; G06V 10/751; G06V 10/40; G06V 10/764; G06V 20/52; G06V 10/147; G06V 10/42; G06V 10/44; G06V 10/56; G06V 10/75; G06V 10/757; G06V 20/20; G06V 10/10; G06V 10/25; G06V 10/26; G06V 10/462; G06V 10/467; G06V 10/62; G06V 10/758; G06V 10/759; G06V 10/761; G06V 20/10; G06V 20/41; G06V 20/53; G06V 20/63; G06V 20/64; G06V 20/653; G06V 20/66; G06V 20/68; G06V 2201/06; G06V 2201/09; G06V 2201/10; G06V 30/194; G06V 30/224; G06V 30/242; G06V 40/161; G06V 40/172; G06V 40/70

See application file for complete search history.

(56) References Cited

U.S. PATENT DOCUMENTS

| | | |
|---|---|---|
| 7,168,618 B2 | 1/2007 | Schwartz |
| 7,225,980 B2 | 6/2007 | Ku et al. |
| 7,689,465 B1 | 3/2010 | Shakes et al. |
| 7,769,221 B1 | 8/2010 | Shakes et al. |
| 7,949,568 B2 | 5/2011 | Fano et al. |
| 8,009,864 B2 | 8/2011 | Linaker et al. |
| 8,091,782 B2 | 1/2012 | Cato et al. |
| 8,175,925 B1 | 5/2012 | Rouaix |
| 8,189,855 B2 | 5/2012 | Opalach et al. |
| 8,423,431 B1 | 4/2013 | Rouaix et al. |
| 8,577,136 B1 | 11/2013 | Ascher et al. |
| 8,630,924 B2 | 1/2014 | Groenevelt et al. |
| 8,688,598 B1 | 4/2014 | Shakes et al. |
| 8,957,970 B1 | 2/2015 | Young et al. |
| 9,147,174 B2 | 9/2015 | Glickman et al. |
| 9,473,747 B2 | 10/2016 | Kobres et al. |
| 9,663,294 B2 | 5/2017 | Young et al. |
| 9,720,934 B1 | 8/2017 | Dube et al. |
| 2002/0143672 A1 | 10/2002 | Sawasaki |
| 2003/0002712 A1 | 1/2003 | Steenburgh et al. |
| 2003/0013951 A1 | 1/2003 | Stefanescu et al. |
| 2003/0154141 A1 | 8/2003 | Capazario et al. |
| 2004/0143516 A1 | 7/2004 | Hastie et al. |
| 2004/0181467 A1 | 9/2004 | Raiyani et al. |
| 2006/0183852 A1 | 8/2006 | Liu et al. |
| 2006/0204107 A1* | 9/2006 | Dugan .................. G06V 20/10 382/209 |
| 2006/0210115 A1 | 9/2006 | Nemet |
| 2006/0285755 A1* | 12/2006 | Hager .................. G06V 20/653 382/224 |
| 2007/0103482 A1 | 5/2007 | Yoshiura et al. |
| 2008/0055087 A1 | 3/2008 | Horii et al. |
| 2008/0077511 A1 | 3/2008 | Zimmerman |
| 2008/0097752 A1 | 4/2008 | Nakamura et al. |
| 2008/0109114 A1 | 5/2008 | Orita et al. |
| 2009/0010484 A1 | 1/2009 | Amidi |
| 2009/0037244 A1 | 2/2009 | Pemberton |
| 2009/0121017 A1 | 5/2009 | Cato et al. |
| 2009/0160975 A1 | 6/2009 | Kwan |
| 2009/0245573 A1 | 10/2009 | Saptharishi et al. |
| 2010/0092093 A1 | 4/2010 | Akatsuka et al. |
| 2010/0172551 A1 | 7/2010 | Gilley et al. |
| 2010/0217678 A1 | 8/2010 | Goncalves |
| 2011/0011936 A1 | 1/2011 | Morandi et al. |
| 2011/0076266 A1 | 3/2011 | Gallo Barraco |
| 2011/0258057 A1* | 10/2011 | Boncyk ............. H04N 21/8126 705/26.61 |
| 2011/0267172 A1 | 11/2011 | Riechel |
| 2012/0011119 A1* | 1/2012 | Baheti ................ G06K 9/6228 707/E17.014 |
| 2012/0087547 A1* | 4/2012 | He ........................ G06K 9/629 382/110 |
| 2012/0120269 A1* | 5/2012 | Capata ................ G06K 9/6257 348/222.1 |
| 2012/0224773 A1 | 9/2012 | Sweet et al. |
| 2012/0284132 A1 | 11/2012 | Kim et al. |
| 2013/0076898 A1 | 3/2013 | Philippe et al. |
| 2013/0163851 A1 | 6/2013 | Dalla-Torre et al. |
| 2013/0235206 A1 | 9/2013 | Smith et al. |
| 2013/0253700 A1 | 9/2013 | Carson et al. |
| 2014/0003727 A1 | 1/2014 | Lortz et al. |
| 2014/0156412 A1 | 6/2014 | Tse |
| 2014/0267776 A1 | 9/2014 | Duthu |
| 2014/0279294 A1 | 9/2014 | Field-Darragh et al. |
| 2015/0016712 A1* | 1/2015 | Rhoads ............... G06V 10/751 707/769 |
| 2015/0019391 A1 | 1/2015 | Kumar et al. |
| 2015/0073907 A1 | 3/2015 | Purves et al. |
| 2015/0248589 A1 | 9/2015 | Broache et al. |
| 2015/0278579 A1 | 10/2015 | Saklatvala |
| 2015/0365634 A1 | 12/2015 | Lin et al. |
| 2017/0083884 A1 | 3/2017 | Vilmosh et al. |
| 2017/0255648 A1 | 9/2017 | Dube et al. |
| 2020/0050626 A1 | 2/2020 | Jung et al. |
| 2020/0081959 A1 | 3/2020 | Chellam et al. |

OTHER PUBLICATIONS

Cristian Pop, "Introduction to the BodyCom Technology", Microchip AN1391, May 2, 2011, pp. 1-24, vol. AN1391, No. DS01391A, Publisher: 2011 Microchip Technology Inc.

\* cited by examiner

AUTOMATED AND PERIODIC UPDATING OF ITEM IMAGES DATA STORE

PRIORITY CLAIM

This application is a continuation of U.S. patent application Ser. No. 16/415,390, filed May 17, 2019, titled "Automated And Periodic Updating Of Item Images Data Store," which is a continuation of U.S. Pat. No. 10,296,814, filed Jun. 27, 2013, the contents of both which are herein incorporated by reference in their entirety.

BACKGROUND

Retailers, wholesalers, and other product distributors typically maintain an inventory of various items that may be ordered, purchased, leased, borrowed, rented, viewed, etc. by clients or customers. For example, an e-commerce website may maintain inventory in a fulfillment center. When a customer orders an item, the item is picked from inventory, routed to a packing station, packed and shipped to the customer. Likewise, physical stores maintain inventory in customer accessible areas (e.g., shopping area) and customers can locate items from within the store, pick the items from inventory and take them to a cashier for purchase, rental, etc.

Many of those physical stores also maintain inventory in a storage area, or fulfillment centers that can be used to replenish inventory located in the shopping areas and/or to satisfy orders for items that are placed through other channels (e.g., e-commerce). Other examples of entities that maintain inventory include libraries, museums, rental centers, and the like. In each instance, the user (e.g., picker, user, customer) must first locate the item and retrieve the item for use and/or purchase.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
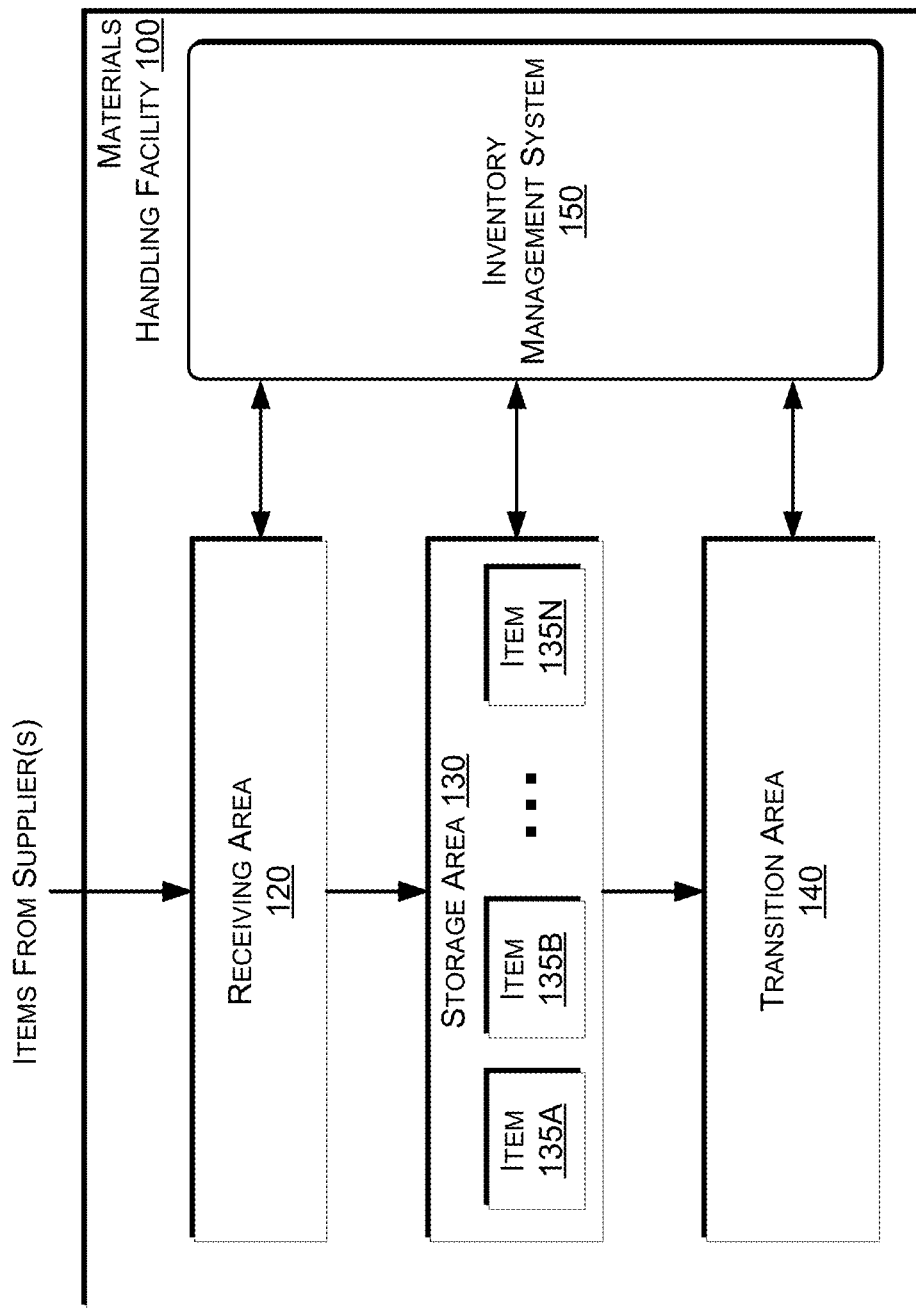
FIG. 1 is a block diagram illustrating a materials handling facility, according to some implementations.

While implementations are described herein by way of example, those skilled in the art will recognize that the implementations are not limited to the examples or drawings described. It should be understood that the drawings and detailed description thereto are not intended to limit implementations to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

This disclosure describes a system for automatically updating an item images data store used for image verification of items within a materials handling facility. Item recognition is performed by capturing one or more images of an item, processing that image to identify item features, and then comparing an arrangement of those item features with item image information stored in an item images data store. Based on correlations between the arrangement of item features identified from the processed image and the stored item image information, the item can be identified.

While this process of image comparison works well when comparing similar images, for a robust system it is necessary to have item features and images of an item from multiple positions, angles, and conditions. The implementations described herein provide a feedback loop that automatically updates and expands the item image information maintained in the item images data store based on images of items as they are captured and processed. For example, when a user (e.g., picking agent) within the materials handling facility retrieves an item from an inventory location, one or more images of that item may be captured. Those images are processed and the item identified based a comparison of the arrangement of item features identified from the images with item image information stored in the item images data store. Once the item identity has been verified, the captured images and/or the processed item image information are associated with the item and stored in the item image data store for use when processing future images of items captured within the materials handling facility of the item.

In some implementations, it may be determined that a correlation between arrangement of item features identified in one or more of the captured images and the stored item image information does not satisfy a confidence threshold such that the image cannot be utilized to identify the product. However, once the product is identified, that image and the corresponding item image information (e.g., the arrangement of item features) may be associated with the item and stored in the item images data store as representative of the item. When the item is later imaged for identification under the same or similar conditions, the now stored item image information can be used to verify the identity of the item. By automatically updating the item images data store with additional images of items and/or additional item image information, the item identification process improves and accounts for changes in the environment. For example, if the lighting changes, once images captured under the new lighting are obtained and associated with the item, the identification process will accurately identify the item.

An implementation of a materials handling facility configured to store and manage inventory items is illustrated in FIG. 1. As used herein, a materials handling facility may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of material (inventory) handling.

As shown, a materials handling facility 100 includes a receiving area 120, a storage area 130 configured to store an arbitrary number of inventory items 135A-135N, and one or more transition areas 140. The arrangement of the various areas within materials handling facility 100 is depicted functionally rather than schematically. For example, in some implementations, multiple different receiving areas 120, storage areas 130 and/or transition areas 140 may be interspersed rather than segregated. Additionally, the materials handling facility 100 includes an inventory management system 150 configured to interact with each of receiving area 120, storage area 130, transition area 140 and/or users within the materials handling facility 100.

The materials handling facility 100 may be configured to receive different kinds of inventory items 135 from various suppliers and to store them until a user orders or retrieves one or more of the items. The general flow of items through the materials handling facility 100 is indicated using arrows. Specifically, as illustrated in this example, items 135 may be received from one or more suppliers, such as manufacturers, distributors, wholesalers, etc. at receiving area 120. In various implementations, items 135 may include merchandise, commodities, perishables, or any suitable type of item depending on the nature of the enterprise that operates the materials handling facility 100.

Upon being received from a supplier at receiving area 120, items 135 may be prepared for storage. For example, in some implementations, items 135 may be unpacked or otherwise rearranged, and the inventory management system 150 (which, as described below, may include one or more software applications executing on a computer system) may be updated to reflect the type, quantity, condition, cost, location, images or any other suitable parameters with respect to newly received items 135. It is noted that items 135 may be stocked, managed or dispensed in terms of countable, individual units or multiples of units, such as packages, cartons, crates, pallets or other suitable aggregations. Alternatively, some items 135 such as bulk products, commodities, etc. may be stored in continuous or arbitrarily divisible amounts that may not be inherently organized into countable units. Such items 135 may be managed in terms of measurable quantities such as units of length, area, volume, weight, time duration or other dimensional properties characterized by units of measurement. Generally speaking, a quantity of an item 135 may refer to either a countable number of individual or aggregate units of an item 135 or a measurable amount of an item 135, as appropriate.

In addition to arranging items, in some implementations, one or more images of the items may be captured as part of receiving. For example, the receiving area 120 may include cameras that capture images of the items as they are unpacked and/or otherwise prepared for storage. These images may be provided to and processed by the inventory management system 150 to identify features of the items and to determine an arrangement of those features. If the item is already known to the inventory management system 150 (e.g., inventory is already stored in the storage area) the processed item image information may be compared with item image information maintained in the item images data store to confirm that the item can be identified based on the captured image. If the item can be identified, the receive process can be completed and the item transitioned to the storage area 130. However, if the item cannot be identified from the captured images and/or if the item is not previously known to the inventory management system 150, the processed item image information may be associated with the item and stored in the item images data store.

After arriving through receiving area 120, items 135 may be stored within storage area 130. In some implementations, like items 135 may be stored or displayed together in bins, on shelves or via other suitable storage mechanisms, such that all items 135 of a given kind are stored in one inventory location within the storage area 130. In other implementations, like items 135 may be stored in different locations. For example, to optimize retrieval of certain items 135 having high turnover within a large physical facility, those items 135 may be stored in several different inventory locations to reduce congestion that might occur at a single point of storage. In general, the inventory management system 150 may maintain a mapping or location information identifying where within the materials handling facility each item is stored. Each inventory item may be associated with the corresponding inventory location in which it is stored and the association may be maintained in an inventory data store 715 (FIG. 7) accessible by the inventory management system 150.

When a customer order specifying one or more of the items 135 is received, or as a user progresses through the materials handling facility 100, the corresponding items 135 may be selected or "picked" from inventory locations within the storage area 130. For example, in one implementation a user may have a list of items to pick and may progress through the materials handling facility picking items 135 from the inventory locations within the storage area 130. In other implementations, materials handling facility employees may pick items 135 from inventory locations within the storage area 130 using written or electronic pick lists derived from customer orders.

As discussed in more detail below, one or more images of the item may be captured as it is picked from the storage area 130. For example, when the user reaches an inventory location and passes their hand into an inventory location within the storage area 130, one or more images of the item may be captured as the user removes the item from the inventory location. Those images may be processed to identify and/or verify the identity of the item retrieved by the user. In some implementations, item identification may be determined based on the inventory location from which the user retrieved the item. The image processing may be performed to confirm that the item associated with the inventory location actually corresponds with the retrieved item. In other implementations, the item may be identified based on actions of the user. For example, an identification of the item as determined by the inventory location or other means (e.g., bar code, QR code, bokode, RFID, or other visual code) may be presented to the user. If the user confirms the items identity, places the item in a tote, or otherwise acknowledges the identity of the item, such user action may be used to identify, or confirm the identity of the item.

To further illustrate, the item associated with the inventory location may initially be determined as the item retrieved by the user. Images are captured of the item as it is retrieved and processed to identify features for the item. Once the features have been identified, the arrangement of those features is compared with stored item information maintained in the item images data store for the item associated with the inventory location and a correlation score determined for each comparison. If there is not a high correlation score between the arrangement of features and one or more of the stored item image information, or if none of the correlation scores satisfy a confidence threshold, the arrangement of features identified from the processed image may be compared with item image information maintained in the item images data store associated with other items.

If a higher correlation score is determined for another item, it may be determined that the actually retrieved item is not the item associated with the inventory location. However, if there is no higher correlation score for the processed image, the item associated with the inventory location may be utilized as the retrieved item. In some instances, the user may be asked to confirm the identity of the item. Once confirmed, the captured images and/or processed item image information (e.g., arrangement of features) is associated with the item and stored in the item images data store for future use in identifying images. In another example, the determined identity of the item may be presented to the user for confirmation. In some instances, the identity of the item may be presented on a nearby display, projected onto a nearby surface and/or presented on a portable device accessible to the user. The resulting user action may be used to confirm the identity of the item. For example, if the user acknowledges the identity of the item as presented to the user, the item identity is confirmed. As another example, even if the user does not specifically acknowledge the identity of the item but performs another positive action, such as placing the item in a tote or keeping the item, the user's action can be used to confirm the identity of the item.

Figure 2:
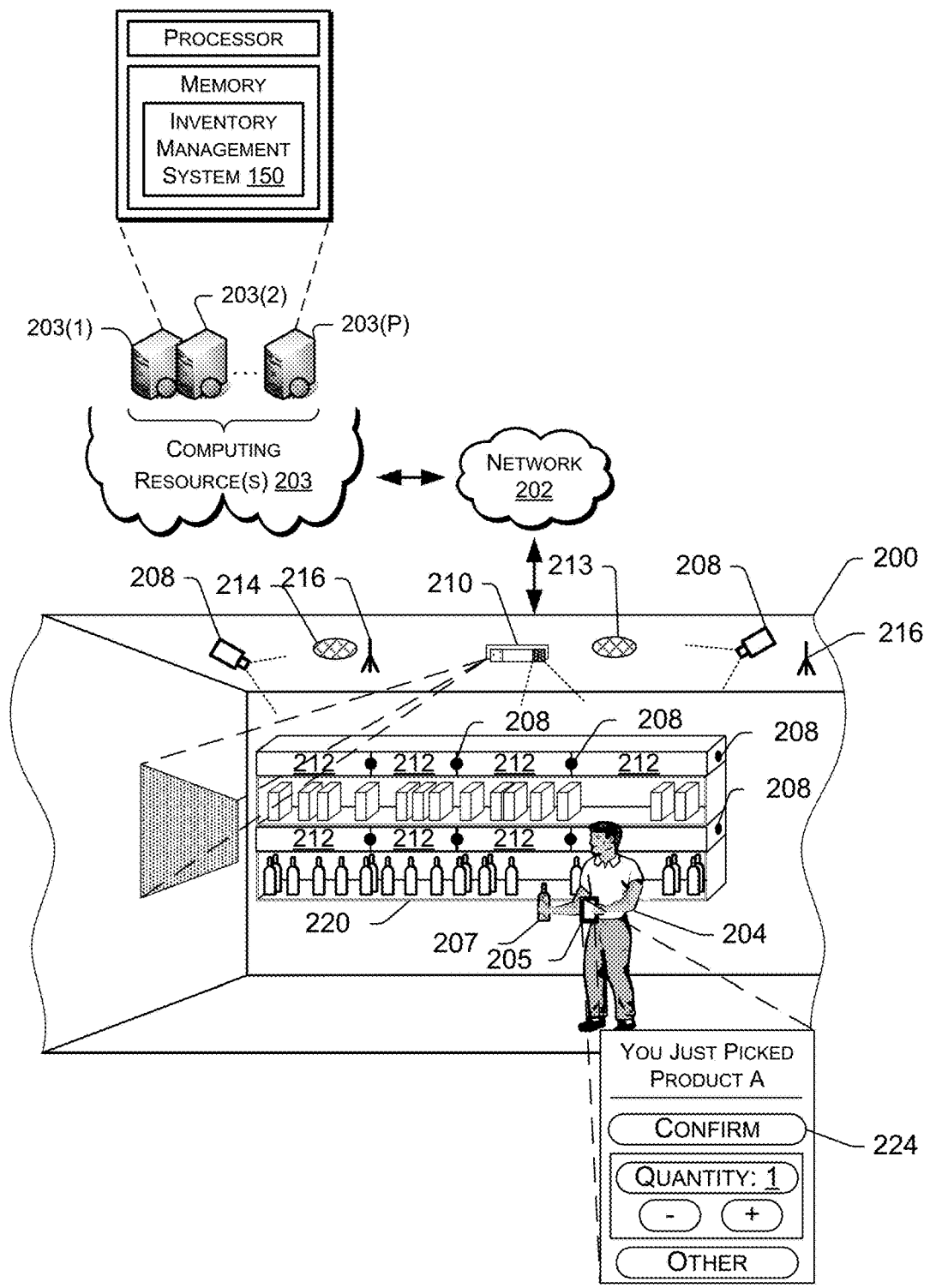
FIG. 2 is a block diagram illustrating additional details of a materials handling facility, according to some implementations.

FIG. 2 shows additional components of a materials handling facility 200, according to some implementations. Generally, the materials handling facility 200 may include one or more image capture devices, such as cameras 208. For example, one or more cameras 208 may be positioned in locations of the materials handling facility 200 so that images of items and/or users within the materials handling facility can be captured. In some implementations, the image capture devices 208 may be positioned overhead, such as on the ceiling to capture images of users, locations within the materials handling facility and/or items within the materials handling facility. In addition, in some implementations, one or more cameras 208 may be positioned on or inside of inventory locations 220. For example, a series of cameras 208 may be positioned on external portions of the inventory locations 220 and positioned to capture images of users, the location surrounding the inventory location 220 and/or items as they are placed into the inventory location or removed from the inventory location. Likewise, one or more cameras 208 may be positioned within the inventory locations 208 to capture images of items stored in the inventory locations 208 and/or images of objects (e.g., items, hands) moving into and/or out of the inventory locations 208.

Any type of camera and/or configuration of cameras may be used with the implementations described herein. For example, one or more of the cameras may be RGB cameras. In other implementations, one or more of the cameras may be depth sensing cameras.

In addition to camera's, other input devices, such as pressure sensors, infrared sensors, a scale, a volume displacement sensor, a light curtain, radio frequency identifier ("RFID") tag scanner, visual code reader (e.g., barcode reader, bokode reader, QR code reader), etc. may be utilized with the implementations described herein. For example, a pressure sensor and/or a scale may be used to detect when an item is added and/or removed from inventory locations. Likewise, an infrared sensor may be used to distinguish between a user's hand and inventory items. In still other implementations, a visual code or tag may be located on the items such that the items can be identified by a visual code reader.

In some implementations, a user 204 located in the materials handling facility 200 may possess a portable device 205 and obtain information about items 207 located within the materials handling facility 200 via the portable device. Generally, the portable device 205 has at least a wireless module to facilitate communication with the inventory management system 150 and a display (e.g., a touch based display) to facilitate visible presentation to and interaction with the user 204. The portable device 205 may store a unique identifier and provide that unique identifier to the inventory management system 150. In some instances, the portable device may also have other features, such as audio input/output (e.g., speaker(s), microphone(s)), video input/output (camera(s), projector(s)), haptics (e.g., keyboard, keypad, touch screen, joystick, control buttons) and/or other components.

In some instances the portable device 205 may operate in conjunction with or may otherwise utilize or communicate with one or more components of the inventory management system 150. Likewise, components of the inventory management system 150 may interact and communicate with the portable device 205 as well as identify the user, communicate with the user via other means and/or communicate with other components of the inventory management system 150.

The inventory management system 150 may also include other input/output devices, such as projectors 210, displays 212, speakers 213, microphones 214, etc. to facilitate communication between the inventory management system 150 and the user 204. In some implementations, multiple input/output devices may be distributed within the materials handling facility. Likewise, the inventory management system 150 may also include one or more communication devices, such as wireless antennas 216 that facilitate wireless communication (e.g., Wi-Fi, Near Field Communication (NFC), Bluetooth) between the inventory management system 150 and the portable device 205. The inventory management system 150 may also include one or more computing resource(s) 203 that may be local to the environment (e.g., materials handling facility), remote from the environment, or any combination thereof.

The inventory management system 150 may utilize antennas 216 within the materials handling facility to create a local wireless network 202 (e.g., Wi-Fi) so that the portable device 205 can connect to and communicate with the inventory management system 150. Likewise, in instances when one or more of the components of the inventory management system 150 are remote from the materials handling facility, they may communicate with other components of the inventory management system 150 and/or the portable device 205 via the network 202.

The following is an example use case for automatically updating the item images data store utilizing images captured as an item is removed from an inventory location 220 and identified. In some implementations, when the user 204 retrieves an item from an inventory location 220 within the storage area 130 of the materials handling facility 200, one or more imaging devices 208 may obtain/capture one or more images of the item as it is retrieved and provide the image(s) to the computing resource(s) 203 for processing. For example, if the user retrieves an item 207, image capture devices 208 that have a visual line-of-sight with the item 207 capture images of the item 207 as it retrieved from the inventory location 220 by the user 204. The captured images are provided to the computing resources 203 and processed by the inventory management system 150 to identify features of the item included in the captured images. Once all features of the item included in the captured images are identified, an arrangement of those features is determined. In some implementations, the images are processed in greyscale to identify features and determine an arrangement of those features. The features and arrangement of features are included in the item image information for the image.

As the images are processed, the processed item image information is compared with item image information maintained in the item images data store to determine an image correlation. For example, the item images data store may maintain multiple sets of item image information, each of which may include an arrangement of features, for multiple inventory items within the materials handling facility. In one implementation, each inventory item may have multiple images and corresponding item image information associated therewith that is maintained in the item images data store. When a new image is processed the arrangement of the identified features may be compared with one or more of the stored item image information for one or more of the inventory items to determine how well the item image information for the captured image compares with stored item image information, and a correlation score determined.

The image correlation scores identify how similar the arrangement of features identified from the processed image is to the arrangement of features included in each of the stored item image information. The stored item image information with the highest correlation score may be selected and the associated item identified. In addition, a determination may be made as to whether the correlation score(s) meets or exceeds a confidence threshold. The confidence threshold may be any number that specifies a likelihood that the identified item is the actual item.

Image processing may be performed for each image of the item that was captured as the user retrieved the item. Based on the collective item image information, an accuracy score may be determined. The accuracy score may represent how accurate the collective item image information is at accurately identifying the item from the captured images. For example, even if each of the correlations scores do not satisfy the confidence threshold, collectively they may be considered as an accuracy score and a determination made as to whether the accuracy score exceeds an accuracy threshold. If the accuracy score exceeds an accuracy threshold, the user may be notified as to the identity of the retrieved item.

Once the identity of the item is determined, if one or more of the images did not satisfy the confidence threshold, that image and/or the corresponding item image information may be automatically associated with the item and stored in the item images data store for use when processing future images. This association and storage in the item images data store for later processing may be done because the other images of the item obtained during the same time period were able to confirm the identity of the item with a high degree of certainty.

If the identity of the item cannot be confirmed, other inputs may be utilized to determine the identity of the item. For example, the user may be asked to confirm the identity of the item, a visual code or tag on the item may be read, and/or other user actions by be used to determine the identity of the item. User action may include the user affirmatively identifying the item, placing the item in a tote, cart or other carrier, or performing any other action with respect to the item that can be used to confirm the identity of the item. Once the identity of the item is confirmed, the captured images and processed item image information may be automatically associated with the item, stored in the item images data store, and used by the inventory management system 150 when comparing future images to determine an identity of an item.

The item image information stored in the item images data store may include the image of the item, the features obtained from the image of the item, the arrangement of features, the date/time that the image was captured, the location within the materials handling facility where the image was captured, the pan-tilt-zoom of the image capture device that captured the image, the hardware information for the image capture device that captured the image, an identifier identifying the image capture device, the identity of the associated item, an identification of the last user to handle the item, information about the last person to handle the item, and the like. For example, information about the last person to handle the item may be used as a factor in determining how likely the actual item corresponds with the identified item. If the last person to handle the item was an associate that was stocking inventory at that location, there is a high likelihood that the actual item and the identified item correspond. However, if the last person to handle the item was a user, that placed the item at the inventory location, such information may be used to reduce the likelihood that the actual item corresponds with the identified item.

In another example, if the item identifier is presented to the user and the user indicates that the identified item does not match the actual item, the inventory management system 150 may utilize this information in multiple ways. For example, if the identified item and the actual item do not match, the item image information stored in the item images data store may be updated to indicate the potential for false positives for those images. In another implementation, those images may be removed from the item images data store. Likewise, if the user corrects the inaccuracy and identifies the actual item retrieved, the inventory management system 150 may compare the item image information from the captured images with the item image information stored in the item images data store to determine the likely probability that the item identified by the user is the actual item. If the correlation score is high and/or close to the confidence threshold, the item image information obtained from the captured images may be associated with the identified item and stored in the item images data store. However, if the correlation score is not close to the confidence threshold, the item may be flagged for additional analysis. For example, an associate may be dispatched to manually confirm the identity of the item. In another example, the captured images may be manually reviewed to determine the identity of the item. Once the identity of the actual item is confirmed, the captured images and/or corresponding item image information may be associated with that item and stored in the item images data store.

In some implementations, if information is presented to the user from the inventory management system 150, such information may be presented via the portable device 205 and/or other output devices positioned within the materials handling facility. The portable device may be used to identify to the user a confirmation of the item removed from the inventory location and/or to request that the user identify the inventory item removed/placed into the inventory location. For example, if the identity of a removed inventory item is not able to be confirmed through image processing and/or other means, the inventory management system 150 may identify the item to the user via a user interface 224 and request confirmation that the identified item corresponds to the actual item. For example, the portable device 205 may identify to the user that the user has removed/picked item A from the inventory location. The user may then confirm the identity of the item, identify how many of those items were removed from the inventory location (picked) and/or identify a different item as the item that was removed from the inventory location.

Figure 3:
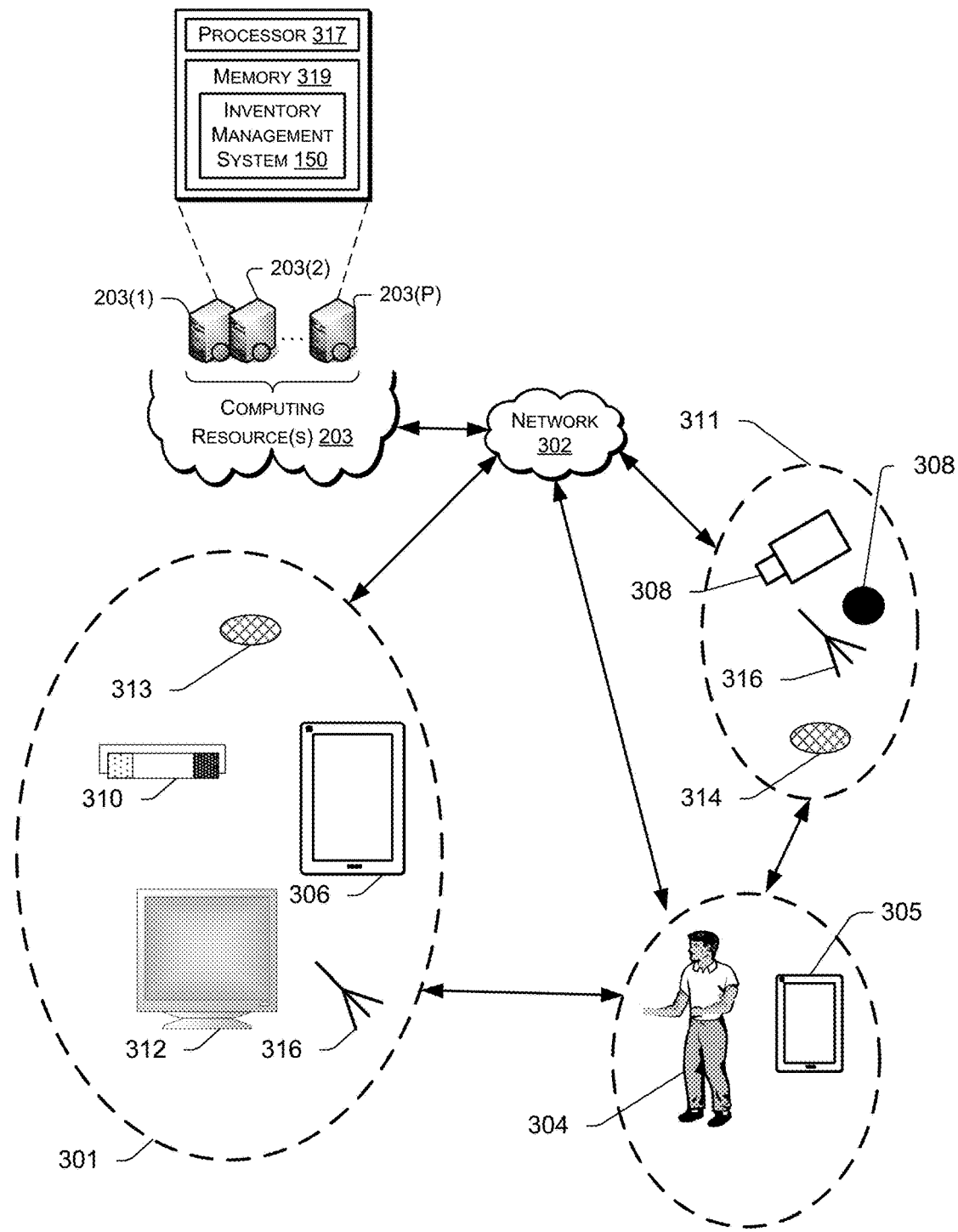
FIG. 3 shows additional components and communication paths between component types utilized in a materials handling facility of FIG. 1, according to some implementations.

FIG. 3 shows additional components and communication paths between component types utilized in an inventory management system 150 of FIG. 1, in accordance with some implementations. As discussed above, the portable device 305 may communicate and interact with various components over a variety of communication paths. Generally, the inventory management system 150 and/or the materials handling facility may include input components 311, output components 301 and computing resource(s) 203. The input components 311 may include a camera 308, microphone 314, antenna 316, sensor (not shown), scale (not shown), light curtain (not shown) or any other component that is capable of receiving input about the surrounding environment, from the user of the portable device and/or from the portable device. The output components 301 may include a projector 310, a portable device 306, a display 312, an antenna 316, a radio (not shown), speakers 313 and/or any other component that is capable of providing output.

The inventory management system 150 may also include computing resource(s) 203. The computing resource(s) 203 may be local to the environment (e.g., materials handling facility), remote from the environment, or any combination thereof. Likewise, the computing resource(s) 203 may be configured to communicate over a network 302 with input components 311, output components 301 and/or directly with the portable device 305 and/or the user 304.

As illustrated, the computing resource(s) 203 may be remote from the environment and implemented as one or more servers 203(1), 203(2), ..., 203(P) and may, in some instances form a portion of a network-accessible computing platform implemented as a computing infrastructure of processors, storage, software, data access, and so forth that is maintained and accessible by components/device of the inventory management system 150 via a network 302, such as the Internet. For example, the computing resources 203 may process images to determine whether an item has been removed from an inventory location or placed into an inventory location. The computing resource(s) 203 do not require end-user knowledge of the physical location and configuration of the system that delivers the services. Common expressions associated for these remote computing resource(s) 203 include "on-demand computing," "software as a service (Saas)," "platform computing," "network-accessible platform," "cloud services," "data centers," and so forth.

Each of the servers 203(1)-(P) include a processor 317 and memory 319, which may store or otherwise have access to an inventory management system 150, which may include or provide image processing (e.g., for user identification, expression identification, and/or item identification), inventory tracking, and/or location determination.

The network 302 may utilize wired technologies (e.g., wires, USB, fiber optic cable, etc.), wireless technologies (e.g., RF, IR, NFC, cellular, satellite, Bluetooth, etc.), or other connection technologies. The network 302 is representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies.

In some implementations, the inventory management system 150 and/or the item images data store, may be utilized to process images received from multiple material handling facilities. For example, the remote computing resources 302 may communicate over the network 302 with multiple material handling facilities and receive images from those materials handling facilities for processing. In some implementations, a single item images data store may be maintained for inventory items of all of the multiple materials handling facilities. For example, if some inventory items are common across all materials handling facilities, the item images data store may maintain item image information for that inventory item and use that item image information for processing images received from any of the materials handling facilities. In other implementations, a separate item images data store may be maintained for each materials handling facility. When an image is received it may be determined what materials handling facility provided the image and the corresponding item images data store may be utilized when processing the image.

Figure 4:
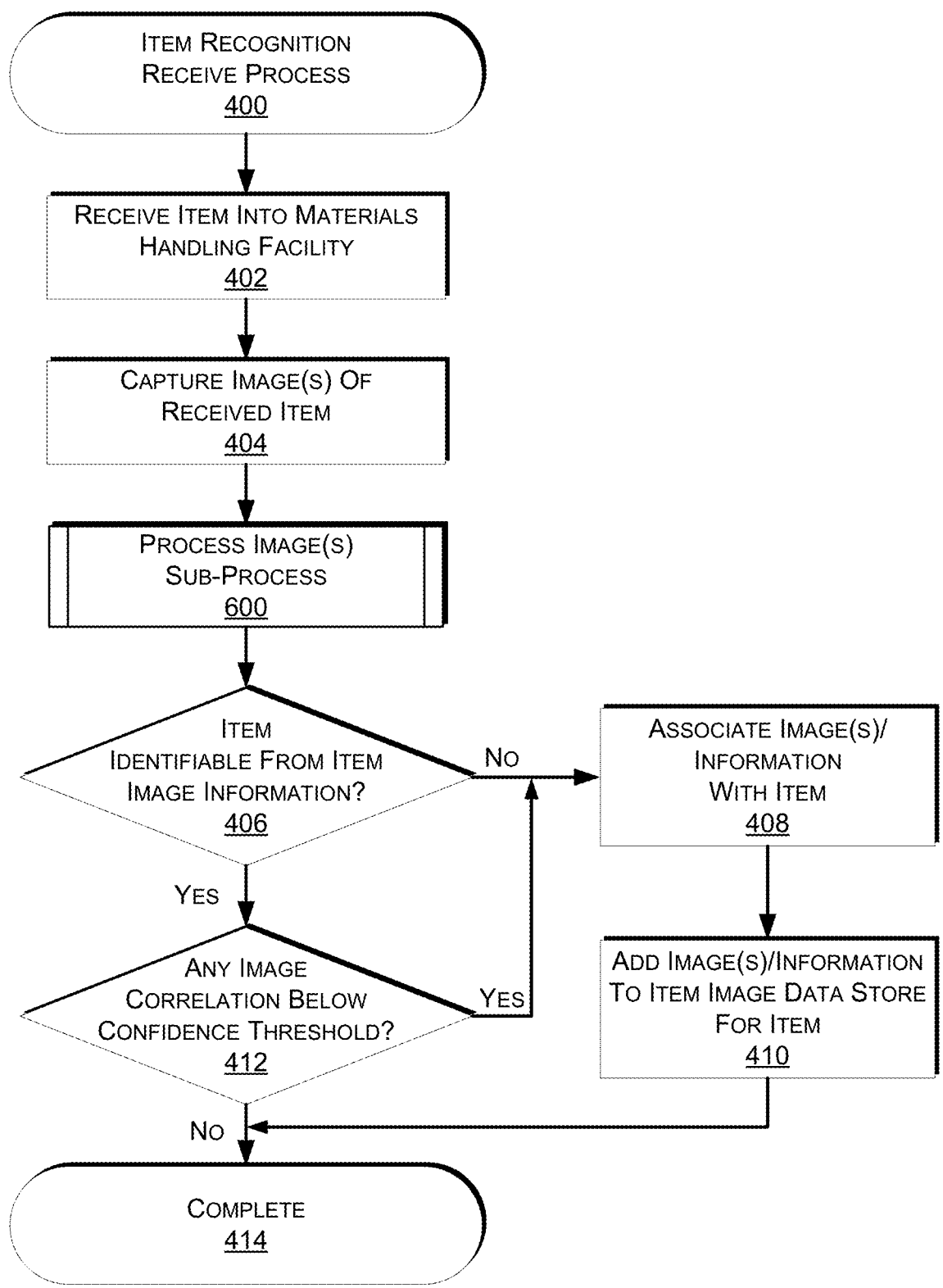
FIG. 4 depicts a flow diagram of an example process for confirming item recognition of items during a receive process, according to some implementations.

FIG. 4 depicts a flow diagram of an example item recognition receive process 400 for identifying items during receive at a materials handling facility, according to some implementations. The process of FIG. 4 and each of the other processes discussed herein may be implemented in hardware, software, or a combination thereof. In the context of software, the described operations represent computer-executable instructions stored on one or more computer-readable media that, when executed by the one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMS, EEPROMs, flash memory, magnetic or optical cards, solid-state memory devices, or other types of storage media suitable for storing electronic instructions. In addition, in some implementations the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

The example process 400 begins when an item is received into a materials handling facility at the receiving area 120, as in 402. When items are received they are identified by the receiving agent. For example, the receiving agent may scan a bar code or other identifier to identify the item that is being received. During receive one or more images of the item(s) are captured, as in 404. In some implementations, the capturing of images may be performed at different stages of the receive process. For example, if the items are being segmented or otherwise separated for storage in the storage area, images may be captured as the items are separated. In other implementations, images may be captured when the items have completed receive but before they are placed into a storage area.

Regardless of when images are captured for the item being received, the captured images are processed to identify features of the item, to determine an arrangement of those features, and to attempt to identify the item, as in sub-process 600. The sub-process 600 for processing images is discussed in further detail below with respect to FIG. 6.

Based on the results of image processing, a determination is made as to whether the item being received was identifiable from the captured image(s), as in 406. If it is determined that the item was not identifiable from the captured image(s), the captured images are associated with the item, as in 408. As discussed above, during receive the identity of the item is known. Utilizing this information, the captured images and/or the item image information returned from the process images sub-process 400 can be associated with the identity of the known item, even though processing of the images was not able to generate a high correlation score and identify the item from the images. A low correlation score may result, for example, because the orientation of the item when the image was captured is different from prior images, the packaging for the item has changed, the lighting in the receiving area has changed, the hardware (e.g., cameras) has changed, and the like.

In addition to associating the captured images with the item, the images and/or the item image information obtained from processing the images (e.g., the arrangement of identified features of the item) and the associations are stored in the item images data store, as in 410. By storing the item image information, later processing of captured images will be improved as the data set for that item has been automatically increased to include these images and the corresponding item image information for the item.

Returning to decision block 406, if the item is identifiable from the processing of the captured images, a determination is made as to whether any of the captured images received a correlation score below the confidence threshold. Similar to the above, captured images may receive a low correlation score if the item image information processed from the captured image (e.g., the arrangement of identified features) does not have a high correlation with any of the item image information stored in the item images data store. For example, if the captured image is taken under different lighting, if the packaging of the item has changed, if the orientation of the item is different, etc., the correlation score may be low.

If it is determined that one or more images received a correlation score below the confidence threshold, the example process 400 proceeds to block 408 and continues as discussed above. However, if all of the images received a correlation score above the confidence threshold or after images are added to the data store, the example process 400 completes, as in 414.

While the example process 400 only discusses adding processed item image information to the item images data store when the correlation score does not exceed the confidence threshold, in other implementations, all images captured for an item and/or the resulting item image information may be associated with the item and added to the item images data store. In still other implementations, it may be determined how frequently the item is identifiable based on the stored item image information. If the item is identifiable a high percentage of the time (e.g., 99%) the image and/or item image information may not be stored. However, if the item is not identifiable a high percentage of the time, the image and/or the item image information may be associated with the item and stored in the item images data store for use in future image processing.

Likewise, in some implementations, item image information stored in the item images data store may be updated and/or weighted. For example, older item image information may be removed from the item images data store as new item image information is added. In still other implementations, stored item image information may be utilized at different times of the day and/or different days of the year. For example, lighting in the materials handling facility may change throughout the day. In such an implementation, images captured in the morning may be utilized for processing during the morning, images captured during the afternoon may be utilized for processing during the afternoon, images captured during the evening may be utilized for processing during the evening and/or images captured at night may be utilized for processing during the night.

Figure 5:
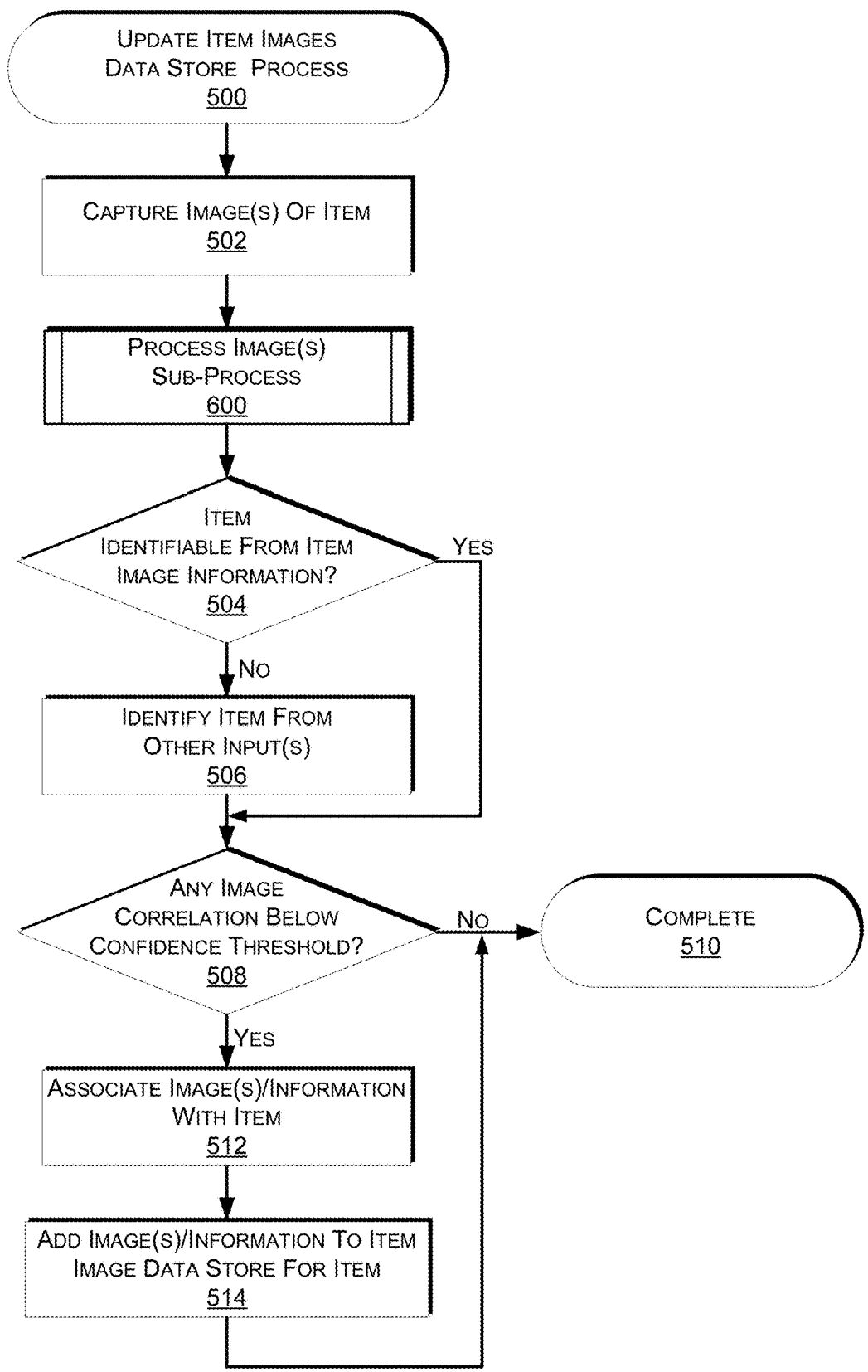
FIG. 5 depicts a flow diagram of an example process for updating an item images data store, according to some implementations.

FIG. 5 depicts a flow diagram of an example process 500 for automatically updating the item images data store, according to some implementations. The example process 500 begins by capturing one or more images of an item, as in 502. This may be done when a user is removing an item from an inventory location, when a user is placing an item into an inventory location, while an item is stored at an inventory location, and/or at any other time. For example, as a user is removing an item from an inventory location within the materials handling facility, one or more cameras mounted overhead that have a line-of-sight to the item being removed may capture one or more images of the item. Likewise, cameras mounted on or in the inventory location that have a line-of-sight to the item being removed may capture one or more images of the item.

Regardless of when and from where images of an item are captured, the captured images are processed to generate item image information and to attempt to identify the item from the image, as in sub-process 600. As noted above, item image information may include the image of the item, the arrangement of features identified from the image of the item, the date/time that the image was captured, the location within the materials handling facility where the image was captured, the pan-tilt-zoom of the image capture device that captured the image, the hardware information for the image capture device that captured the image, the identity of the associated item, the identity of the last person to handle the item, and the like. The sub-process 600 for processing images is discussed in further detail below with respect to FIG. 6.

Based on the results of the image processing, a determination is made as to whether the item being received was identifiable from the captured image(s), as in 504. If it is determined that the item was not identifiable from the image(s), the item is identified from other inputs, as in 506. For example, the user may identify the item either through affirmative confirmation or by other actions, the item may be identified using RFID, a visual code (e.g., QR code, barcode), an associate may identify the item, the item may be identified based on the inventory location from which it was removed, etc. Likewise, item image information associated with the item may be considered. For example, the item information may identify the last person to handle the item and such information may assist in identifying the item. If the last person to handle the item was an associate who placed the item at the inventory location during an item stocking routine, there item can be identified with a high probability.

Upon identifying the item, either from the processing of the captured images and/or from other inputs, a determination is made as to whether there is any image with a correlation score below the confidence threshold, as in 508. If it is determined that there are no captured images with an image correlation score below the confidence threshold, the example process completes, as in 510. However, if there are captured images with a correlation score below the confidence threshold, the item image information processed from those captured images is associated with the identified item, as in 512, and stored in the item images data store, as in 514.

While the example process 500 only discusses adding processed item image information to the item images data store when the correlation score does not exceed the confidence threshold, in other implementations, all images captured for an item and/or the corresponding item image information may be associated with the item and added to the item images data store. In still other implementations, it may be determined how frequently the item is identifiable based on the stored item image information. If the item is identifiable a high percentage of the time (e.g., 99%) the image and item image information may not be stored. However, if the item is not identifiable a high percentage of the time, the image and/or the item image information may be associated with the item and stored in the item images data store for use in future image processing.

Likewise, in some implementations, item image information stored in the item images data store may be updated and/or weighted. For example, older item image information may be removed from the item images data store as new item image information is added. In still other implementations, stored item image information may be utilized at different times of the day and/or different days of the year. For example, lighting in the materials handling facility may change throughout the day. In such an implementation, images captured in the morning may be utilized for processing during the morning, images captured during the afternoon may be utilized for processing during the afternoon, images captured during the evening may be utilized for processing during the evening and/or images captured at night may be utilized for processing during the night.

In still other implementations, item image information may be collected and additional analysis may be performed to ensure that if the item image information is added to the item images data store it will improve the accuracy of item identification. For example, item images and corresponding item image information may be collected for an item during a period of time (e.g., one day, one week) and a regression analysis performed on those images and/or those images and the stored item image information to confirm that the addition of those images will increase the accuracy of item identification. This may be done for each of the images, groups of the image, or all of the images. Based on the regression analysis, only images that improve item identification accuracy may be added to the item images data store.

Figure 6:
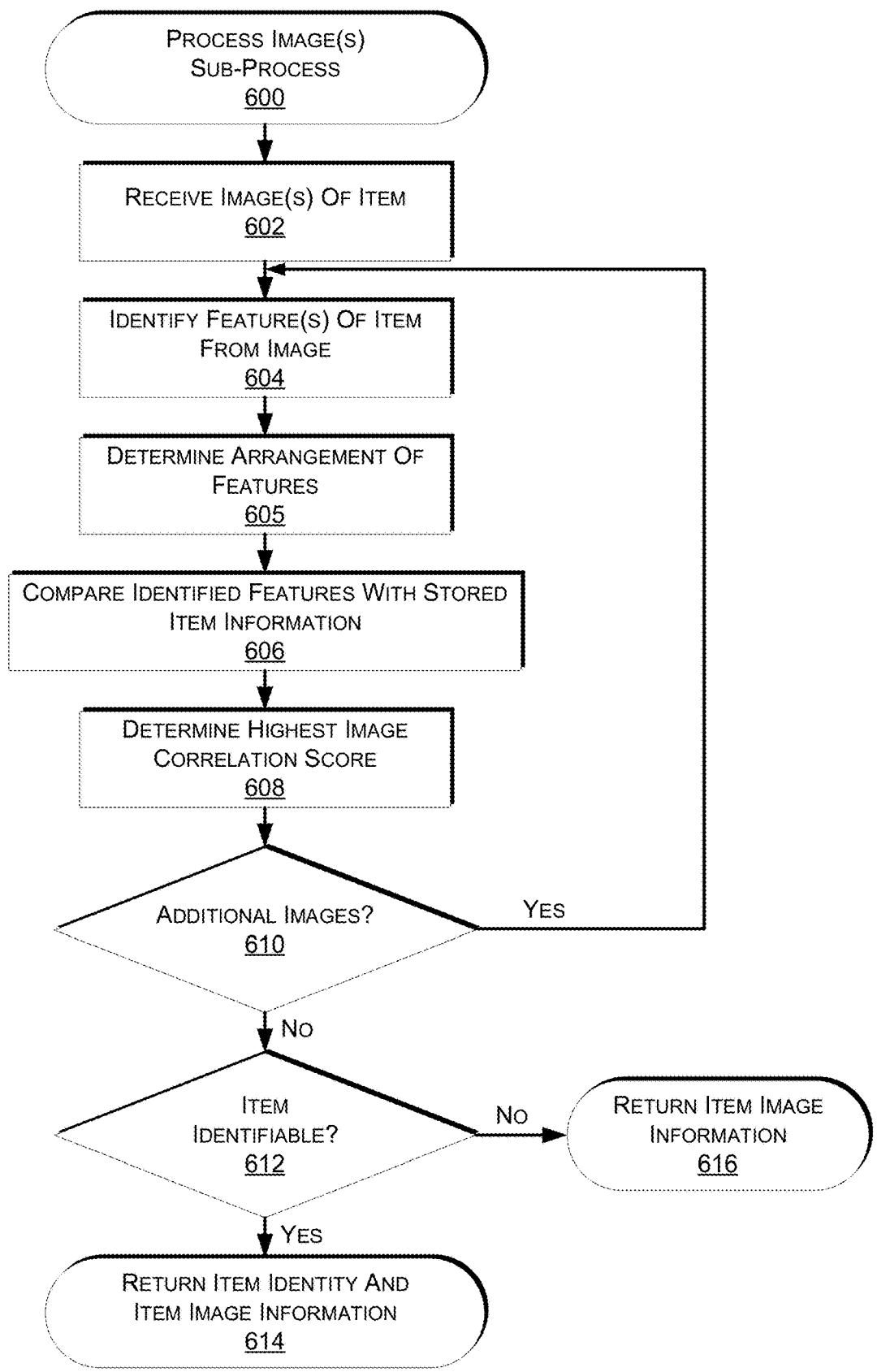
FIG. 6 depicts a flow diagram of an example sub-process for processing captured images, according to some implementations.

FIG. 6 depicts a flow diagram of an example sub-process 600 for processing captured images, according to some implementations. The example sub-process begins upon receipt of one or more captured images of an item, as in 602. A received image is processed to identify features of an item in the image. In some implementations, the image may be processed in grey-scale to identify features. Features of an item may be anything or combination of things that are identifiable for that item. For example, a feature may be the shape of the item, a color of the item, the label or logo on the item, the wording on the item, a symbol on the item, a character on the item, a word on the item, a number on the item, a texture of the item, a gradient of the item, a shape of the item, a reflectivity of the item, an edge of the item, and the like. For example, "Organic Dressing" identified on a label positioned on a tall slender bottle may be a feature. As will be appreciated, depending on the orientation of the item when the image is captured, different features may be identified. As such, each image of an item may include multiple, and/or different features.

An arrangement of the identified features may then be determined, as in 605. The arrangement may be a two dimensional relationship of the features with respect to each other as captured in the image. In other implementations, the arrangement of features may be a three-dimensional arrangement with respect to each other as captured in the image.

The arrangement of the identified features is then compared with item image information stored in the item images data store, as in 606. As discussed above, the item image information stored in the item images data store includes arrangements of features for images that have previously been identified and associated with the item. A captured image may be processed to identify features, determine the arrangement of those features and that arrangement of features may be compared with the arrangement of features stored as part of the item image information for previously captured images of items. As discussed above, each inventory item may have multiple images and corresponding item image information stored in the item images data store. The arrangement of features identified for the captured image may be compared to stored item image information and a correlation score determined for each comparison. Based on the comparisons, the stored item image information that results in the highest correlation score may be selected for that item, as in 608. The correlation score identifies the similarity between the arrangement of features identified in the captured image and the arrangement of features in the stored item image information.

After processing the image and determining correlation scores, a determination is made as to whether there are additional images to process, as in 610. If it is determined that there are additional images to process, the example sub-process 600 returns to block 604 and continues. If there are no additional images to process, the example process 600 determines if an item is identifiable from the images, as in 612. An item may be identifiable from the images if, for example, the collective correlation score(s) provide a high degree of confidence of the identity of the item. For example, even though individual image correlation scores may not satisfy the confidence threshold, if there are multiple images that have a correlation score that is near the confidence threshold, the collective may provide enough confidence that the item can be identified. As another example, if three images of an item are captured and two of those images return a correlation score that exceeds the confidence threshold but the third does not, it may still be determined that the item is identifiable based on the two images that exceed the confidence threshold.

If it is determined that the item is identifiable from the captured image(s), the identity of the item and the item image information is returned, as in 614. However, if it is determined that the item is not identifiable from the captured images, the item image information is returned without the identity of the item, as in 616.

Figure 7:
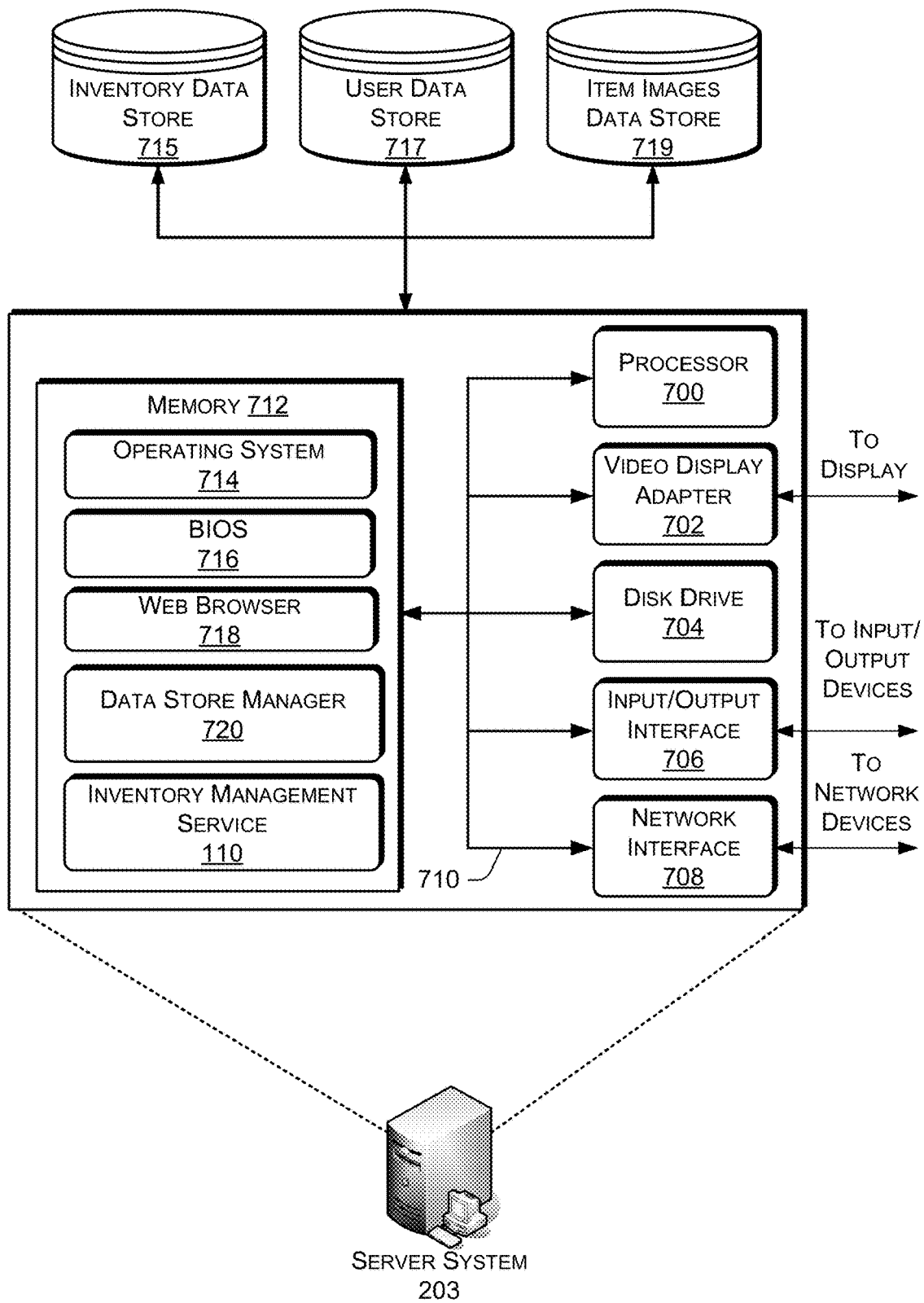
FIG. 7 is a block diagram of an illustrative implementation of a server system that may be used with various implementations.

FIG. 7 is a pictorial diagram of an illustrative implementation of a server system, such as the server system 203 that may be used in the implementations described herein. The server system 203 may include a processor 700, such as one or more redundant processors, a video display adapter 702, a disk drive 704, an input/output interface 706, a network interface 708, and a memory 712. The processor 700, the video display adapter 702, the disk drive 704, the input/output interface 706, the network interface 708, and the memory 712 may be communicatively coupled to each other by a communication bus 710.

The video display adapter 702 provides display signals to a local display (not shown in FIG. 7) permitting an operator of the server system 203 to monitor and configure operation of the server system 203. The input/output interface 706 likewise communicates with external input/output devices not shown in FIG. 7, such as a mouse, keyboard, scanner, or other input and output devices that can be operated by an operator of the server system 203. The network interface 708 includes hardware, software, or any combination thereof, to communicate with other computing devices. For example, the network interface 708 may be configured to provide communications between the server system 203 and other computing devices via the network 202, as shown in FIG. 2.

The memory 712 generally comprises random access memory (RAM), read-only memory (ROM), flash memory, and/or other volatile or permanent memory. The memory 712 is shown storing an operating system 714 for controlling the operation of the server system 203. A binary input/output system (BIOS) 716 for controlling the low-level operation of the server system 203 is also stored in the memory 712.

The memory 712 additionally stores program code and data for providing network services that allow the inventory management system 150 to process images and automatically update the item images data store based on verified items. Accordingly, the memory 712 may store a browser application 718. The browser application 718 comprises computer executable instructions, that, when executed by the processor 700 generate or otherwise obtain configurable markup documents such as Web pages. The browser application 718 communicates with a data store manager application 720 to facilitate data exchange between the inventory data store 715, the user data store 717 and/or the item images data store 719.

As used herein, the term "data store" refers to any device or combination of devices capable of storing, accessing and retrieving data, which may include any combination and number of data servers, databases, data storage devices and data storage media, in any standard, distributed or clustered environment. The server system 203 can include any appropriate hardware and software for integrating with the data stores 715, 717, 719 as needed to execute aspects of the inventory management system 150.

The data stores 715, 717, 719 can include several separate data tables, databases or other data storage mechanisms and media for storing data relating to a particular aspect. For example, the data stores 715, 717, 719 illustrated include mechanisms for inventory information, user information, item image information, etc. which can be used to identify an item removed from an inventory location and/or placed into an inventory location.

It should be understood that there can be many other aspects that may be stored in the data stores 715, 717, 719. The data stores 715, 717, 719 are operable, through logic associated therewith, to receive instructions from the server system 203 and obtain, update or otherwise process data in response thereto.

The memory 712 may also include the inventory management system 150, discussed above. The inventory management system 150 may be executable by the processor 700 to implement one or more of the functions of the server system 203. In one implementation, the inventory management system 150 may represent instructions embodied in one or more software programs stored in the memory 712. In another implementation, the inventory management system 150 can represent hardware, software instructions, or a combination thereof.

The server system 203, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction in FIG. 7 should be taken as being illustrative in nature and not limiting to the scope of the disclosure.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computing system, comprising:
one or more processors; and
a memory storing program instructions that, when executed by the one or more processors, cause the one or more processors to at least:
process a first image of an item to determine at least:
a first plurality of features of the item; and
a first arrangement of the first plurality of features in the first image;
determine, based at least in part on a first comparison of the first arrangement of the first plurality of features and stored item image information, a first correlation score indicative of a first similarity between the first arrangement of the first plurality of features and the stored item image information;
process a second image of the item to determine at least:
a second plurality of features of the item; and
a second arrangement of the second plurality of features in the second image;
determine, based at least in part on a second comparison of the second arrangement of the second plurality of features and the stored item image information, a second correlation score indicative of a second similarity between the second arrangement of the second plurality of features and the stored item image information;
determine that the first correlation score does not exceed a threshold;
determine that the second correlation score does not exceed the threshold;
determine, based at least in part on both the first correlation score and the second correlation score collectively, an identity of the item, wherein the identity of the item is associated with the stored item image information; and
based at least in part on of the determination that the first correlation score does not exceed the threshold, store at least one of the first image, a first item image information that includes the first plurality of features and the first arrangement of features, or an association between the item and the first item image information, such that a data set that includes the stored item image information is increased to include at least one of the first image, the first item image information, or the association such that when the item is later imaged for identification by the computing system, the ability of the computing system to identify the item based on the stored item image information is improved.

2. The computing system of claim 1, wherein the first plurality of features of the item include one or more of a shape of the item, a color of the item, a label on the item, a logo on the item, a wording on the item, a symbol on the item, a character on the item, a word on the item, a number on the item, a texture of the item, a gradient of the item, a reflectivity of the item, or an edge of the item.

3. The computing system of claim 1, wherein the program instructions that, when executed by the one or more processors to cause the one or more processors to process the first image, further include program instructions that, when executed by the one or more processors, further cause the one or more processors to at least:
   convert the first image to grey-scale.

4. The computing system of claim 1, wherein the first arrangement of the first plurality of features is a two dimensional relationship between each of the first plurality of features.

5. The computing system of claim 1, wherein the first arrangement of the first plurality of features is a three-dimensional relationship between each of the first plurality of features.

6. The computing system of claim 1, wherein the stored item image information includes arrangements of features for images that have previously been identified and associated with the item.

7. The computing system of claim 1, wherein the first image and the second image are generated at a same time.

8. A computer-implemented method, comprising:
   processing a plurality of images of an item to determine, for each image of the plurality of images, an arrangement of a plurality of features of the item represented in the image;
   determining, based at least in part on a first comparison of a first arrangement of a first plurality of features of a first image of the plurality of images and stored item image information, a first correlation score indicative of a first similarity between the first arrangement of the first plurality of features of the first image and the stored item image information;
   determining, based at least in part on a second comparison of a second arrangement of a second plurality of features of a second image of the plurality of images and the stored item image information, a second correlation score indicative of a second similarity between the second arrangement of the second plurality of features of the second image and the stored item image information;
   determining that the first correlation score does not exceed a threshold;
   determining that the second correlation score does not exceed the threshold;
   determining, based at least in part on both the first correlation score and the second correlation score collectively, an identity of the item, wherein the identity of the item is associated with the stored item image information; and
   based at least in part on determining that the first correlation score does not exceed the threshold, storing at least one of the first image, a first item image information that includes the first arrangement of the first plurality of features, or an association between the item and the first item image information, such that a data set that includes the stored item image information is increased to include at least one of the first image, the first item image information, or the association such that when the item is later imaged for identification by the method, the ability of the method to identify the item based on the stored item image information is improved.

9. The computer-implemented method of claim 8, wherein the first plurality of features include one or more of a shape of the item, a color of the item, a label on the item, a logo on the item, a wording on the item, a symbol on the item, a character on the item, a word on the item, a number on the item, a texture of the item, a gradient of the item, a reflectivity of the item, or an edge of the item.

10. The computer-implemented method of claim 8, wherein the first arrangement of the first plurality of features includes one or more of a two dimensional relationship between each of the first plurality of features or a three dimensional relationship between each of the first plurality of features.

11. The computer-implemented method of claim 8, wherein determining the first correlation score includes:
   comparing the first arrangement of the first plurality of features with a third arrangement of features included in the stored item image information.

12. A computing system, comprising:
   one or more processors; and
   a memory storing program instructions that, when executed by the one or more processors, cause the one or more processors to at least:
   obtain a first image of an item;
   determine, based at least in part on a first processing of the first image, a first arrangement of a first plurality of features of the item as represented in the first image;
   compare the first arrangement of the first plurality of features with stored item image information to determine a first correlation score indicative of a first similarity between the first arrangement of the first plurality of features and the stored item image information;
   determine, based at least in part on a second processing of a second image of the item, a second arrangement of a second plurality of features of the item as represented in the second image;
   compare the second arrangement of the second plurality of features with the stored item image information to determine a second correlation score indicative of a second similarity between the second arrangement of the second plurality of features and the stored item image information;
   determine that the first correlation score does not exceed a threshold;
   determine that the second correlation score does not exceed the threshold;
   in response to determination that the first correlation score and the second correlation score do not exceed the threshold, determine that the first correlation score and the second correlation score collectively provide a confidence that the item can be identified;

identify the item based at least in part on both the first correlation score and the second correlation score collectively; and based at least in part on the determination that the first correlation score does not exceed the threshold, store at least one of the first image, a first item image information that includes the first arrangement of the first plurality of features, or an association between the item and the first item image information, such that a data set that includes the stored item image information is increased to include at least one of the first image, the first item image information, or the association such that when the item is later imaged for identification by the computing system, the ability of the computing system to identify the item based on the stored item image information is improved.

13. The computing system of claim 12, wherein the stored item image information includes arrangements of features for images that have previously been identified and associated with the item.

14. The computing system of claim 12, wherein the first plurality of features include one or more of a shape of the item, a color of the item, a label on the item, a logo on the item, a wording on the item, a symbol on the item, a character on the item, a word on the item, a number on the item, a texture of the item, a gradient of the item, a reflectivity of the item, or an edge of the item.

15. The computing system of claim 12, wherein the program instructions further include program instructions that, when executed by the one or more processors, further cause the one or more processors to at least:

convert the first image to a grey-scale image; and process the grey-scale image to determine the first arrangement of the first plurality of features.

16. The computing system of claim 12, wherein the first arrangement of the first plurality of features includes one or more of a two dimensional relationship between each of the first plurality of features or a three dimensional relationship between each of the first plurality of features.

\* \* \* \* \*